United States Patent
Koike

(10) Patent No.: US 9,360,390 B2
(45) Date of Patent: Jun. 7, 2016

(54) PRESSURE MEASURING INSTRUMENT AND SUBSTRATE PROCESSING APPARATUS PROVIDED WITH THE PRESSURE MEASURING INSTRUMENT

(71) Applicant: TOKYO ELECTRON LIMITED, Tokyo (JP)

(72) Inventor: Satoru Koike, Oshu (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 116 days.

(21) Appl. No.: 14/150,457

(22) Filed: Jan. 8, 2014

(65) Prior Publication Data

US 2014/0196545 A1    Jul. 17, 2014

(30) Foreign Application Priority Data

Jan. 16, 2013  (JP) ................. 2013-005777

(51) Int. Cl.
  *G01L 9/00* (2006.01)
  *G01L 19/14* (2006.01)
  *G01L 19/06* (2006.01)

(52) U.S. Cl.
  CPC ............. *G01L 19/145* (2013.01); *G01L 9/0042* (2013.01); *G01L 19/0636* (2013.01)

(58) Field of Classification Search
  CPC . G01L 19/0636; G01L 19/145; G01L 9/0042; G01L 13/025
  USPC ................................. 73/717, 718
  See application file for complete search history.

(56) References Cited

U.S. PATENT DOCUMENTS

| | | | |
|---|---|---|---|
| 6,606,912 B2 * | 8/2003 | Ohmi et al. | 73/756 |
| 7,252,011 B2 * | 8/2007 | Traverso | 73/756 |
| 2005/0279454 A1 * | 12/2005 | Snijders | 156/345.29 |
| 2013/0189160 A1 * | 7/2013 | Blankenship et al. | 422/88 |

FOREIGN PATENT DOCUMENTS

JP   2009-524024 A   6/2009

* cited by examiner

*Primary Examiner* — Lisa Caputo
*Assistant Examiner* — Roger Hernandez-Prewit
(74) *Attorney, Agent, or Firm* — Nath, Goldberg & Meyer; Jerald L. Meyer

(57) ABSTRACT

There is provided a pressure measuring instrument including: a detecting unit including the reference pressure chamber therein and formed in a cylindrical shape, the diaphragm being disposed inside the detecting unit; a communicating unit for providing communication between the diaphragm and the measurement pressure chamber, and formed in a circular tube shape having an inner diameter smaller than an inner diameter of the detecting unit; and an annular flow-path forming unit disposed between the detecting unit and the communicating unit, and configured to form a substantially annular path. The communicating unit introduces a gas of the measurement pressure chamber into the substantially annular path. The annular flow-path forming unit allows the gas introduced from the communicating unit to pass through the substantially annular path and to supply the passing gas to a side surface of the diaphragm.

6 Claims, 9 Drawing Sheets

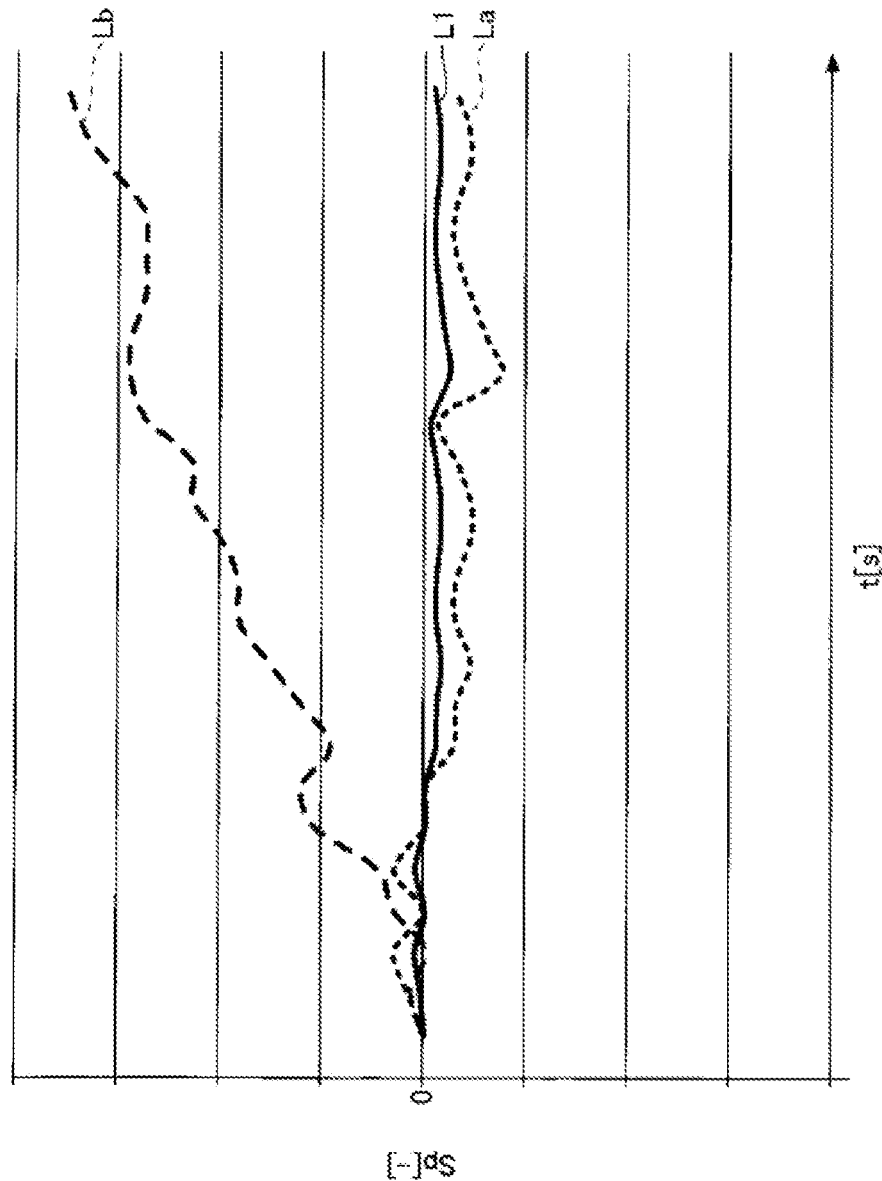

PRESSURE MEASURING INSTRUMENT AND SUBSTRATE PROCESSING APPARATUS PROVIDED WITH THE PRESSURE MEASURING INSTRUMENT

CROSS-REFERENCE TO RELATED APPLICATION

This application claims the benefit of Japanese Patent Application No. 2013-005777, filed on Jan. 16, 2013, in the Japan Patent Office, the disclosure of which is incorporated herein in its entirety by reference.

TECHNICAL FIELD

The present disclosure generally relates to a pressure measuring instrument and a substrate processing apparatus provided with the pressure measuring instrument.

BACKGROUND

A pressure measuring instrument, which is called as a diaphragm-type pressure gauge, has been widely known. In the pressure measuring instrument, a diaphragm (e.g., a diaphragm-type sensor) is disposed between a reference pressure chamber and a measurement pressure chamber and the pressure of the measurement pressure chamber is measured based on a deformation amount of the diaphragm, in which the diaphragm is deformed due to a difference in pressure between the reference pressure chamber and the measurement pressure chamber. A deformable elastic body (e.g., a thin film, etc.) is used as the diaphragm of the pressure measuring instrument. In the pressure measuring instrument, if particles, reaction products and the like adhere to the diaphragm, the adhering particles and the like apply stresses to the diaphragm, thereby affecting the deformation amount (deflection amount) of the diaphragm.

In the related art, there is disclosed a technology in which a plurality of T-like projections is formed on a surface of a diaphragm to capture particles and the like existing in a gas.

According to the related art, it is possible to reduce particles and the like adhering to the diaphragm. However, due to the formation of the T-like projections, the surface structure of the diaphragm becomes complex. In the related art, the T-like projections formed on the surface of the diaphragm can capture solids (particles and the like) contained in a gas. However, sometimes, the T-like projections cannot capture deposits (adhering materials) deposited on the surface of the diaphragm.

For example, in order to measure the internal pressure of a process chamber with a pressure measuring instrument in case that a substrate is processed by an atomic layer deposition (ALD) method or a molecular layer deposition (MLD) method, it is necessary to measure the internal pressure of the process chamber when two kinds of gases reacting with each other are alternately supplied. In this case, two kinds of gases reacting with each other alternately make contact with a surface of a diaphragm, reaction products (deposits) of two kinds of gases may be generated (deposited) on the surface of the diaphragm. In other words, according to the related art, there is a case that the deposits on the surface of the diaphragm cannot be captured by T-like projections formed on the surface of the diaphragm. Moreover, in the related art, there may be a case that the stresses generated by deposits make it impossible to accurately measure the deformation of the diaphragm attributable to the difference in pressure between the reference pressure chamber and the measurement pressure chamber.

SUMMARY

Some embodiments of the present disclosure provide a pressure measuring instrument and a substrate processing apparatus capable of, even when solids adhere to a diaphragm, reducing the influence of stresses generated by the adhered solids on the deformation of the diaphragm.

According to one embodiment of the present disclosure, there is provided a pressure measuring instrument that, using a diaphragm disposed between a reference pressure chamber and a measurement pressure chamber, detects a deformation of the diaphragm and consequently measures a pressure of the measurement pressure chamber, the pressure measuring instrument comprising: a detecting unit including the reference pressure chamber therein and formed in a cylindrical shape, the diaphragm being disposed inside the detecting unit; a communicating unit for providing communication between the diaphragm and the measurement pressure chamber, and formed in a circular tube shape having an inner diameter smaller than an inner diameter of the detecting unit; and an annular flow-path forming unit disposed between the detecting unit and the communicating unit, and configured to form a substantially annular path, wherein the communicating unit configured to introduce a gas of the measurement pressure chamber into the substantially annular path, the annular flow-path forming unit configured to allow the gas introduced from the communicating unit to pass through the substantially annular path and to supply the passing gas to a side surface of the diaphragm, and the substantially annular path is formed at a location opposite to a location at which a differential value of a displacement of the diaphragm reaches a peak.

According to another embodiment of the present disclosure, there is provided a substrate processing apparatus, including: the pressure measuring instrument; and a substrate processing unit configured to process a substrate in a process chamber that communicates with the measurement pressure chamber.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 2A is a sectional view explaining one example of a pressure measuring instrument according to a first embodiment of the present disclosure, while

FIG. 8 is a graph representing one example of the results of tests conducted to confirm the effects and advantages of the pressure measuring instrument according to the example of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Referring to the accompanying drawings, the present disclosure will be described using a pressure measuring instrument according to a non-limitative and illustrative embodiment. The present disclosure can be applied to not only the below-mentioned pressure measuring instrument but also any other means (e.g., apparatus, device, unit, system or the like) configured to measure a pressure using a diaphragm and based on a deformation amount of the diaphragm.

In the following description, identical or equivalent devices, parts or members shown in the accompanying drawings will be designated by identical or equivalent reference symbols with no repeated description made thereon. Unless specifically mentioned otherwise, the drawings are not intended to show a limitative relationship between devices, parts or members. Accordingly, specific correlations can be decided by an ordinary skilled person in light of the non-limitative embodiments which will be described below.

The present disclosure will now be described using a pressure measuring instrument 100 according to a first embodiment or a substrate processing apparatus 200 according to a second embodiment.

[First Embodiment]

[Configuration of Pressure Measuring Instrument]

Figure 2A:
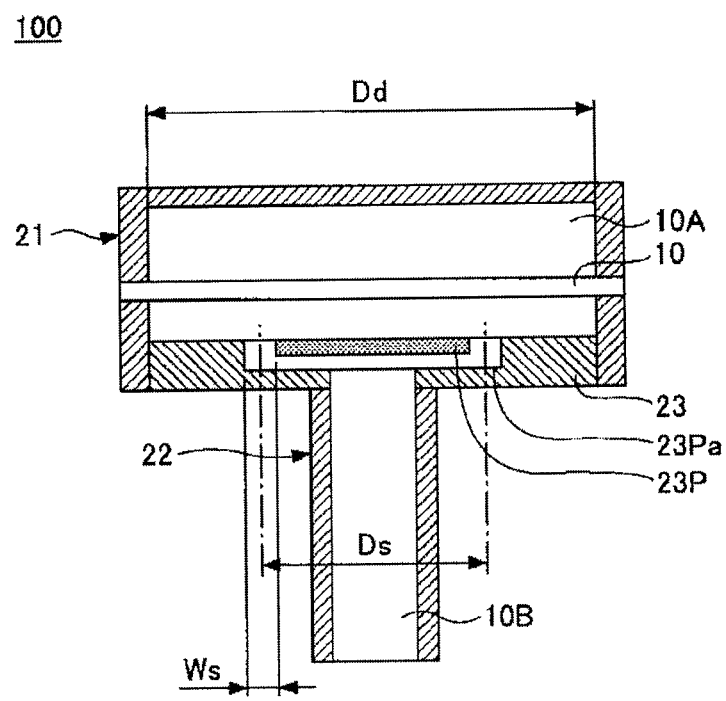
Figure 2B:
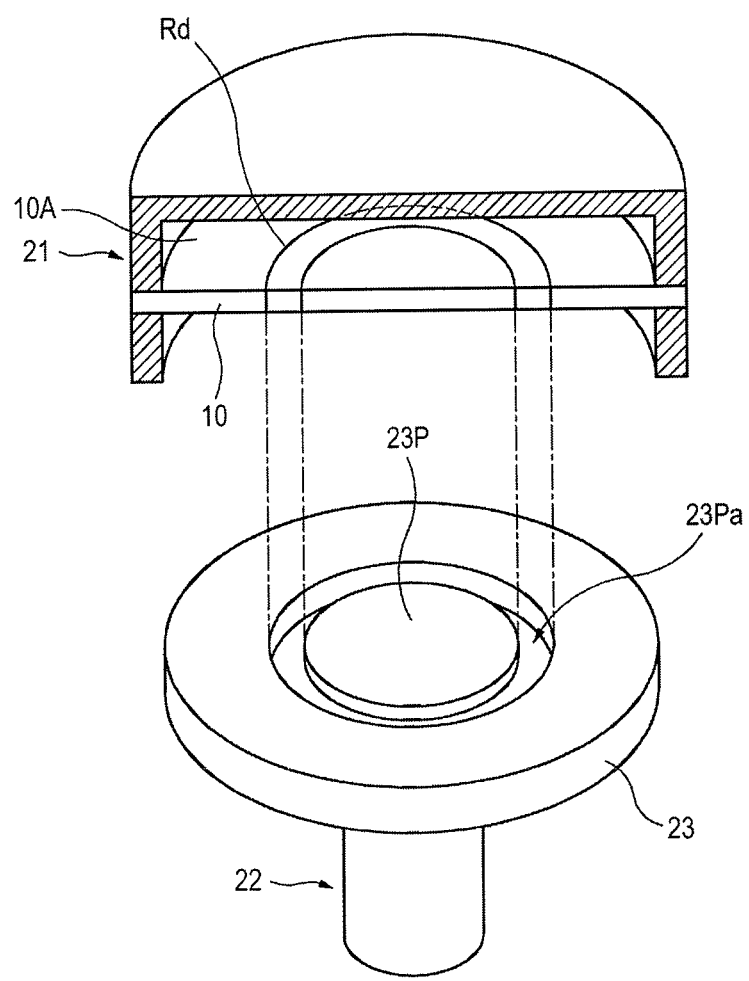
FIG. 2B is a perspective view of the pressure measuring instrument of FIG. 2A with a detecting unit being separated from an annular flow-path forming unit.

The pressure measuring instrument 100 according to the first embodiment of the present disclosure will be described with reference to FIGS. 2A and 2B. FIG. 2A is a schematic sectional view illustrating one example of the pressure measuring instrument 100 according to the present embodiment, while FIG. 2B is a perspective view of the pressure measuring instrument of FIG. 2A with a detecting unit being separated from an annular flow-path forming unit.

As shown in FIG. 2, the pressure measuring instrument 100 according to the present disclosure is so-called a diaphragm-type pressure gauge. The pressure measuring instrument 100 measures (detects) the pressure of the measurement pressure chamber 10B based on a difference in internal pressure between a reference pressure chamber 10A and a measurement pressure chamber 10B. Furthermore, the pressure measuring instrument 100 detects a difference in internal pressure between the reference pressure chamber 10A and the internal pressure of the measurement pressure chamber 10B, based on a deformation amount of a diaphragm 10 disposed between the reference pressure chamber 10A and the measurement pressure chamber 10B.

In this regard, the reference pressure chamber 10A refers to a sealed space, which is isolated from the exterior of the pressure measuring instrument 100. The reference pressure chamber 10A may be, e.g., a space having a high degree of vacuum. The measurement pressure chamber 10B is a space that communicates with a space for measuring a pressure (hereinafter, referred to as a pressure measurement space). That is to say, the measurement pressure chamber 10B follows a pressure change of the pressure measurement space to thereby alter the internal pressure thereof. The pressure measuring instrument 100 measures the pressure (internal pressure) of the measurement pressure chamber 10B into which a gas is introduced from the pressure measurement space to thereby detect the pressure of the pressure measurement space.

The pressure measuring instrument 100 includes a detecting unit 21 in which the reference pressure chamber 10A is provided, a communicating unit 22 configured to communicate the diaphragm 10 with the measurement pressure chamber 10B, and an annular flow-path forming unit 23 disposed between the detecting unit 21 and the communicating unit 22.

The diaphragm 10 may be deformed based on a difference in pressure between the reference pressure chamber 10A and the measurement pressure chamber 10B. In the present embodiment, as shown in FIGS. 2A and 2B, the diaphragm 10 is disposed (fixed) within the detecting unit 21. The diaphragm 10 may include, e.g., a stainless steel diaphragm, a silicon diaphragm, a ceramic diaphragm, a sapphire diaphragm or the like. The deformation of the diaphragm 10 can be measured by a capacitance type sensor, a piezoelectric sensor, an optical sensor or other sensors capable of detecting deformation.

The detecting unit 21 is a member that forms the reference pressure chamber 10A. In the present embodiment, the detecting unit 21 has a cylindrical shape. The diaphragm 10 is disposed (fixed) within the cylindrical detecting unit 21.

The communicating unit 22 is a member that allows communication between the side surface of the diaphragm 10 the measurement pressure chamber 10B. In the present embodiment, the communicating unit 22 has a circular tube shape. One opening of the communicating unit 22 of the circular tube shape communicates with a space for measuring the pressure (i.e., internal pressure), e.g., a reaction tube 212 (i.e., a process chamber) of a substrate processing apparatus 200 shown in FIG. 4. The other opening of the communicating unit 22 of the circular tube shape is connected to the annular flow-path forming unit 23.

The annular flow-path forming unit 23 is a member that provides a substantially annular path between the detecting unit 21 and the communicating unit 22. The annular flow-path forming unit 23 has a substantially circular opening 23Pa formed in the central region thereof. Further, a circular flat plate 23P, which will be described blow, is fixed to the opening 23Pa.

The circular flat plate 23P is a member that hinders (disturbs) the flow of a gas (fluid) introduced from the communicating unit 22. The circular flat plate 23P may include, e.g., a baffle plate or a buffer plate. The outer diameter of the circular flat plate 23P is smaller than the diameter of the opening 23Pa. That is to say, the circular flat plate 23P is fixed to the opening 23Pa, thereby forming a substantially annular flow path in the opening 23Pa. The specifications of the circular flat plate 23P will be described in the section of [Internal Flow Path of the Pressure Measuring Instrument] to be described below.

[Internal Flow Path of the Pressure Measuring Instrument]

Hereinafter, the internal flow path of the pressure measuring instrument 100 according to the embodiment of the present disclosure will be described.

Figure 1:
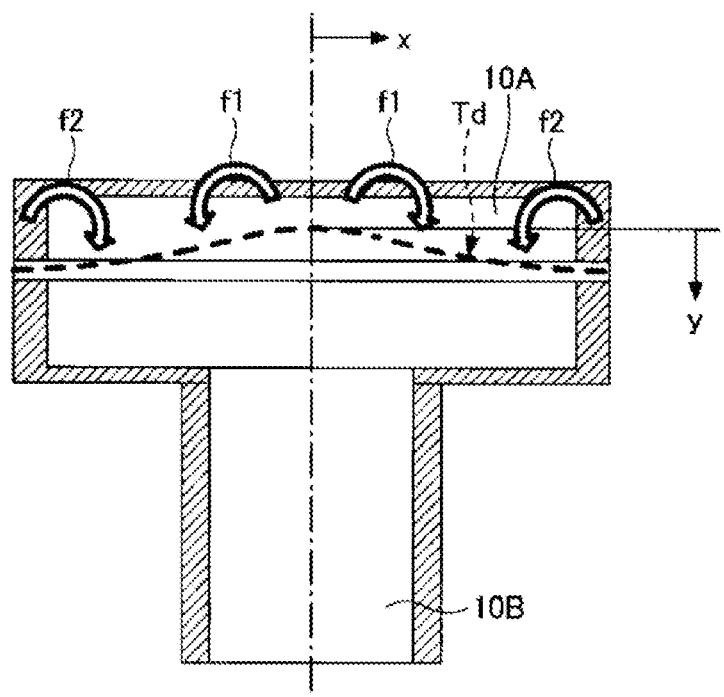
FIG. 1 is an explanatory view explaining stresses acting on a diaphragm.

FIG. 1 is an explanatory view illustrating stresses applied to the diaphragm.

As shown in FIG. 1, the diaphragm Td of the pressure measuring instrument is bent due to a difference in pressure between one side contacting the reference pressure chamber 10A and the other side contacting the measurement pressure chamber 10B of the diaphragm Td. In other words, the diaphragm Td is axial-symmetrically deformed with respect to the center thereof. For example, if the internal pressure of the measurement pressure chamber 10B is higher than the internal pressure of the reference pressure chamber 10A, the central portion of the diaphragm Td is moved (deformed) upward (in a −y direction in FIG. 1).

In the diaphragm Td, if solids (particles, etc.) are contained in a gas introduced into the measurement pressure chamber 10B and the solids adhere to the surface of the diaphragm Td, stresses are generated at the surface of the diaphragm Td by the adhered solids. In the diaphragm Td, for example, if the adhered solids form a film and the film contracts, contraction stresses are generated at the surface of the diaphragm Td. When a pressure is measured based on the deformation of the diaphragm Td, the generated stresses may become plus shift stresses (f1 denoted in FIG. 1) which lead to overestimation of a pressure, or minus shift stresses (f2 denoted in FIG. 1) which lead to underestimation of a pressure. As mentioned above, in the pressure measuring instrument, if solids adhere to the surface of the diaphragm Td, the deformation of the diaphragm Td, which is attributable to the pressure difference, may results in an error. Thus, the pressure measurement accuracy is decreased.

Figure 3:
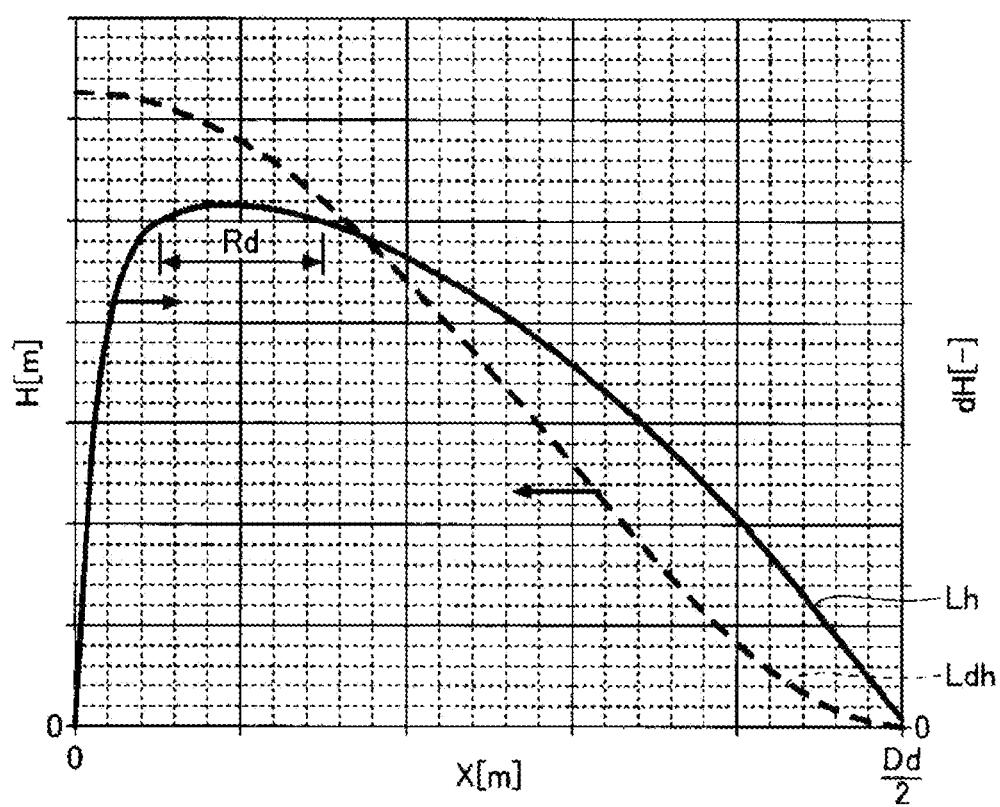
FIG. 3 is a graph explaining one modified example of the diaphragm of the pressure measuring instrument according to the first embodiment of the present disclosure.

FIG. 3 is a graph illustrating one modified example of the diaphragm 10 of the pressure measuring instrument 100 according to the present embodiment. Herein, when the center of the diaphragm 10 is set as an origin, the horizontal axis in FIG. 3 indicates a distance from the center of the diaphragm 10 (location of an x-axis direction in FIG. 1). The dotted line Ldh in FIG. 3 indicates displacements H of the diaphragm 10 at locations away from the center of the diaphragm 10 (displacements of a y-axis direction in FIG. 1) and corresponds to the left vertical axis. The solid line Lh in FIG. 3 indicates an amount of change dH of the diaphragm 10 per unit area (a differential value of the displacement per unit area) and corresponds to the right vertical axis.

As shown in FIG. 3, in the diaphragm 10 of the pressure measuring instrument 100 according to the present embodiment, the displacement H is increased from the outer edge of the diaphragm 10 toward the center thereof when the position of the outer edge of the diaphragm 10 is used as a reference position. In the pressure measuring instrument 100, the amount of change dH (the differential value of the displacement H) reaches a peak at a location away from the center of the diaphragm 10 by a predetermined distance. Herein, a location in which the amount of change dH of the diaphragm 10 reaches a peak is changed depending on a shape and a material of the diaphragm 10. In the pressure measuring instrument 100, the amount of change dH may reaches a peak at a location away from the center toward the outer edge by a distance of, e.g., 10% to 20% of the radius of the diaphragm 10. Moreover, the amount of change dH may reach a peak at a location away from the center toward the outer edge by a distance of, e.g., 10% to 30% of the radius of the diaphragm 10. In the diaphragm 10 of the pressure measuring instrument 100, the amount of change dH is sharply decreased near the center thereof and is gently decreased toward the outer edge thereof.

The amount of change dH of the diaphragm 10 is a deflection of the diaphragm 10. Even if the solids adhere to (or form a film on) the portion at which the deflection is relatively large, the stresses generated by the adherence (or film formation) of the solids are relatively small when compared with the deflection. On the other hand, if the solids adhere to (or form a film on) the portion at the deflection is small, the stresses generated by the adherence (film formation) of the solids are relatively large when compared the deflection. That is to say, the pressure measuring instrument 100 can relatively reduce the influence of the stresses generated by the solids on the diaphragm 10 by allowing the solids to adhere to the portion at which the amount of change dH (the deflection) is large.

When solids adhere to (or are deposited on) the surface of the diaphragm 10, the internal flow path of the pressure measuring instrument 100 according to the present embodiment is designed such that, as shown in FIG. 3, the solids adhere to (or are deposited on) a portion having a range Rd (hereinafter referred to as a "predetermined range") in which the amount of change dH of the diaphragm 10 reaches a peak. That is to say, the pressure measuring instrument 100 reduces the influence of the stresses generated by the adhered solids on the diaphragm 10 on the deformation of the diaphragm 10 by allowing the solids to adhere to a portion of the predetermined range Rd in which the amount of change dH is large. In this way, the pressure measuring instrument 100 can reduce the influence of the stresses generated by the adhered solids on the diaphragm 10. Therefore, even if the solids adhere to the diaphragm 10, the pressure measuring instrument 100 can accurately measure a pressure based on the deformation of the diaphragm 10.

In this regard, the predetermined range Rd includes a location at which the amount of change dH of the diaphragm 10 reaches a peak. The predetermined range Rd may be a range which is decided based on the shape and material of the diaphragm 10. In addition, the predetermined range Rd may be a range which is determined in advance by experiment or calculation.

The configuration of the internal flow path of the pressure measuring instrument 100 in which solids adhere to (or are deposited on) the predetermined range Rd will be described in detail.

As shown in FIGS. 2A and 2B, in the pressure measuring instrument 100 according to the present embodiment, a substantially annular path is formed in the opening 23Pa using the circular flat plate 23P, thereby hindering the flow of a gas (or fluid) introduced from the communicating unit 22. The pressure measuring instrument 100 is configured to supply the gas toward the predetermined range Rd of the diaphragm 10 by allowing the gas introduced from the communicating unit 22 to pass through the substantially annular path formed by the circular flat plate 23P.

That is to say, in the pressure measuring instrument 100, the outer diameter of the circular flat plate 23P is set equal to a size corresponding to the axial symmetric deformation of the diaphragm 10. This makes it possible to form the substantially annular path corresponding to the range that includes the location at which the change amount dH of the diaphragm 10 reaches a peak. Thus, the pressure measuring instrument 100 can be configured to increase the solids adhering to (or educing in) the predetermined range Rd of the diaphragm 10 and can be configured to reduce the solids adhering to (or educing in) a range other than predetermined range Rd of the diaphragm 10.

[Second Embodiment]

The present disclosure will now be described using a substrate processing apparatus (a vertical heat treatment apparatus) 200 according to a second embodiment, which includes the pressure measuring instrument 100 according to the first embodiment. The substrate processing apparatus 200 according to the present embodiment processes a substrate disposed within a process chamber, by alternately supplying an A gas and a B gas reacting to each other into the process chamber. Moreover, the substrate processing apparatus 200 purges the interior of the process chamber using a C gas as an inert gas. At this time, the substrate processing apparatus 200 makes a use of the pressure measuring instrument 100 to measure the internal pressure of the process chamber according to a processed status.

In the following description, the substrate processing apparatus 200 performs substrate processing (i.e., film formation) using an atomic layer deposition (ALD) method or a molecular layer deposition (MLD) method. However, the apparatus and the process which can utilize the present disclosure are not limited to the substrate processing apparatus and the atomic layer deposition method. The ALD method refers to a film forming process that repeats a cycle of adsorbing one of two reaction gases, which react to each other, onto a substrate surface, generating a product due to the reaction of the other reaction gas with the adsorbed reaction gas, and depositing the generated product on the substrate surface.

Figure 4:
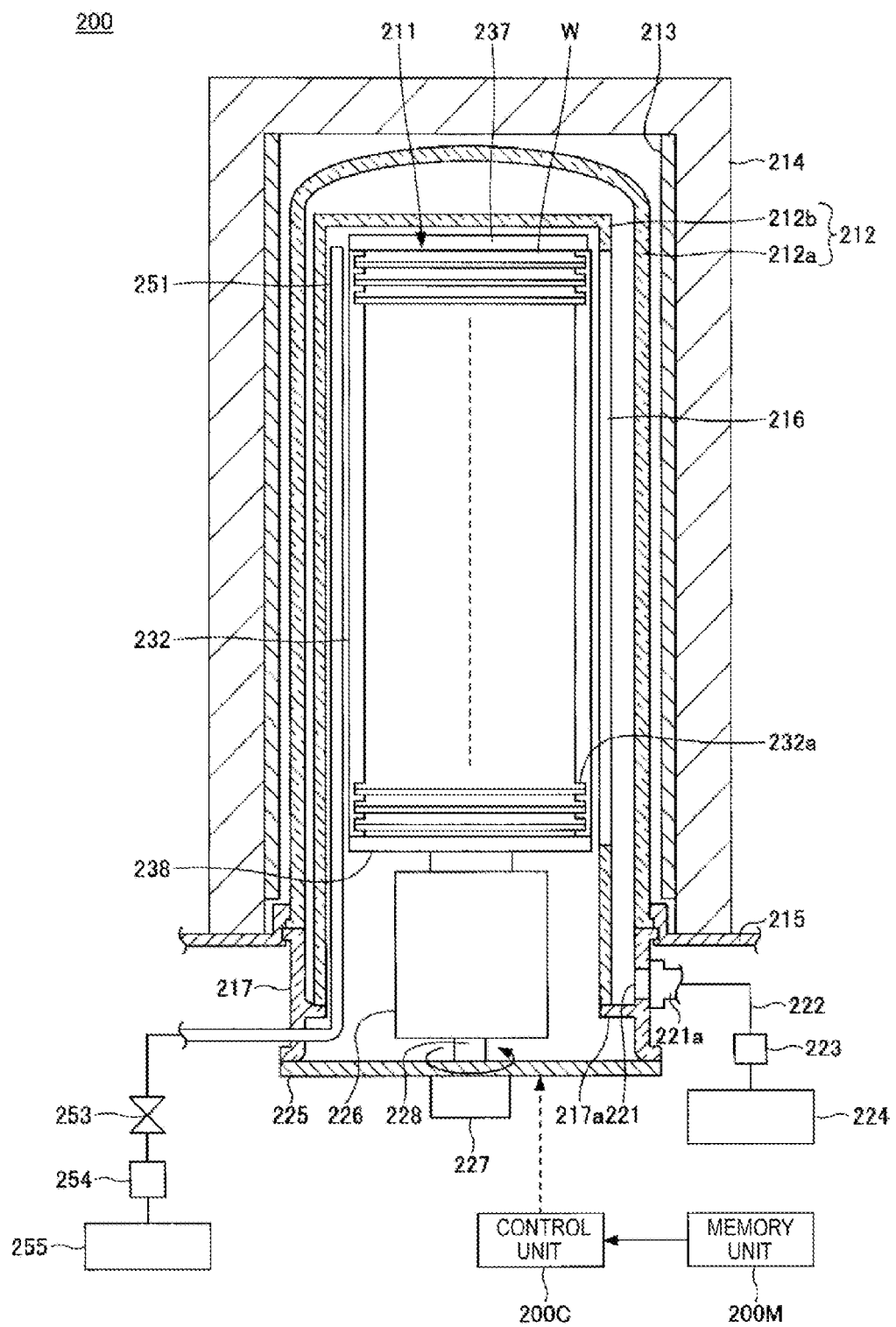
FIG. 4 is a schematic vertical sectional view explaining a substrate processing apparatus (a vertical heat treatment apparatus) according to a second embodiment of the present disclosure.
Figure 5:
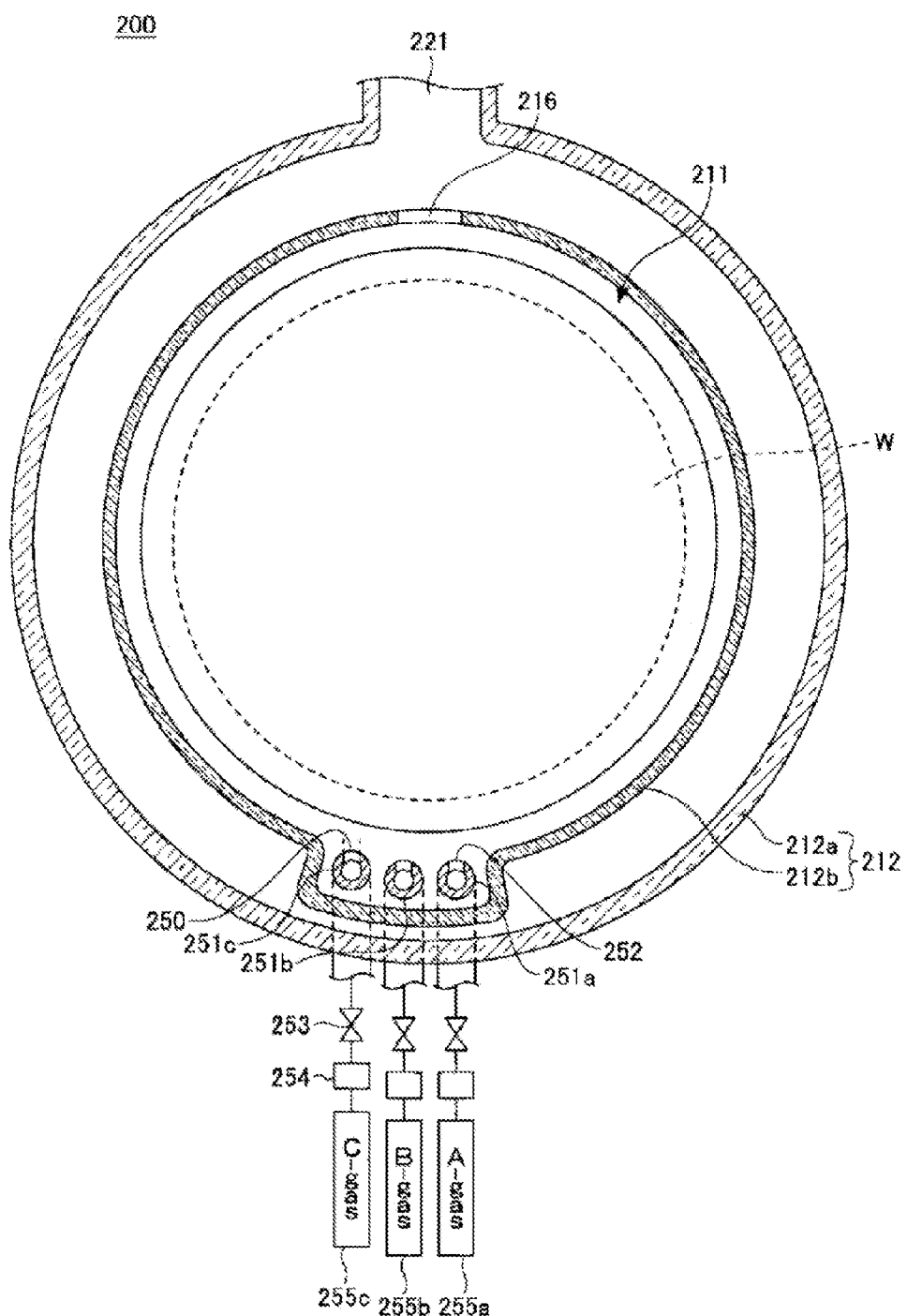
FIG. 5 is a schematic horizontal sectional view explaining the substrate processing apparatus (the vertical heat treatment apparatus) according to the second embodiment of the present disclosure.

The configuration of the substrate processing apparatus 200 will be described in detail with reference to FIGS. 4 and 5. FIG. 4 is a schematic vertical sectional view explaining the substrate processing apparatus 200 according to the present embodiment. FIG. 5 is a schematic horizontal sectional view explaining the substrate processing apparatus 200.

As shown in FIG. 4, the substrate processing apparatus 200 includes a substrate holder 211 configured to hold, in a shelf-like shape, substrates W having a diameter of, e.g., 300 mm, and a reaction tube 212 (i.e., a process chamber) configured to gas-tightly accommodate the substrate holder 211 therein and to perform a film forming process. The substrate processing apparatus 200 further includes a heating unit 213 arranged in a circumferential direction of an inner wall surface of a furnace body 214 outside the reaction tube 212. In the substrate processing apparatus 200, lower end portions of the reaction tube 212 and the furnace body 214 are supported by a base plate 215 extending in the horizontal direction.

The substrate holder 211 includes a plurality of (e.g., three) support pillars 232 extending in the up-down direction. Each of the support pillars 232 has a plurality of groove portions 232a. The support pillars 232 hold the substrates W in the respective holding positions using the groove portions 232a.

The reaction tube 212 has a double-tube structure that includes an outer tube 212a and an inner tube 212b accommodated within the outer tube 212a. The outer tube 212a and the inner tube 212b are formed such that their lower surface sides are opened. The outer tube 212a is formed in a substantially cylindrical shape and its ceiling surface bulges outward. The ceiling surface of the inner tube 212b is horizontally formed. The lower end surfaces of the outer tube 212a and the inner tube 212b are gas-tightly supported by a flange portion 217.

As shown in FIG. 5, the substrate processing apparatus 200 includes, as a gas supply system, a first gas injector 251a, a second gas injector 251b, and a third gas injector 251c, which are arranged in a clockwise direction as viewed from an upper side of the reaction tube 212. The first gas injector 251a is connected to a storage source 255a of an A gas (e.g., a Zr-based gas (source gas) containing zirconium (Zr), a tetrakis (ethylmethylamino)zirconium (TEMAZr) or the like). The second gas injector 251b is connected to a storage source 255b of a B gas (e.g., an $O_3$ (ozone) gas or the like). The third gas injector 251c is connected to a storage source 255c of a C gas (e.g., a $N_2$ (nitrogen) gas or the like). The substrate processing apparatus 200 uses valves 253 and flow rate control units 254 to control flow rates of gases supplied from the gas injector 251a and so forth.

In the substrate processing apparatus 200, the gas injector 251a and so forth are accommodated in an outwardly-bulging portion of the inner tube 212b. The gas injector 251a and so forth are disposed along a longitudinal direction of the substrate holder 211 and away from one another along a circumferential direction of the reaction tube 212. For example, quartz tubes may be used as the gas injector 251a and so forth.

The substrate processing apparatus 200 includes, as a gas exhaust system, a slit-like exhaust port 216 extending along the longitudinal direction of the inner tube 212b at a side surface of the inner tube 212b opposite to the gas injector 251a and so forth. The substrate processing apparatus 200 further includes an exhaust port 221 at the side wall of the flange portion 217 so as to communicate with a region existing between the inner tube 212b and the outer tube 212a. In the substrate processing apparatus 200, an exhaust path 222 extending from the exhaust port 221 is connected to a vacuum pump 224 by way of a pressure control unit 223. In the substrate processing apparatus 200, the gas supplied from the gas injector 251a or 251b is exhausted through the exhaust port 216 to the region existing between the inner tube 212b and the outer tube 212a.

The substrate processing apparatus 200 according to the present embodiment includes a pressure measuring instrument 100E (see FIG. 6), which will be described later, in the exhaust path 222. Thus, the substrate processing apparatus 200 is configured to use the pressure measuring instrument 100 to measure the internal pressure of the reaction tube 212 (the process chamber) into which the A gas, the B gas or the C gas is supplied.

The substrate processing apparatus 200 includes a control unit 200C comprising a computer for controlling its entire operations. Memory of the control unit 200C stores a program for performing a film forming process. The program is installed into the control unit 200C from a memory unit 200M which is a storage medium such as a hard disk, a compact disk, a magneto-optical disk, a memory card, a flexible disk or the like.

Hereinafter, a process performed by the substrate processing apparatus 200 will be described. First, the substrate processing apparatus 200 mounts substrates W (e.g., 150 substrates having a size of 12 inches (300 mm)) onto the substrate holder 211 using a transfer arm (not shown) arranged at a bottom side of the reaction tube 212. Next, the substrate processing apparatus 200 gas-tightly loads the substrate holder 211 into the reaction tube 212 and vacuum-exhausts an atmosphere in the reaction tube 212 using the vacuum pump 224. The substrate processing apparatus 200 heats the substrates W with the heating unit 213 while rotating the substrate holder 211 about a vertical axis. Subsequently, the substrate processing apparatus 200 supplies the A gas (first process gas) into the reaction tube 212, e.g., at 0.4 slm (litter/min), by using the first gas injector 251a, while adjusting the internal pressure of the reaction tube 212 to a process pressure (e.g., 1.0 Torr (133 Pa)) based on the measurement result of the pressure measuring instrument 100 in the exhaust path 222. At this time, if the A gas makes contact with the surfaces of the substrates W, atomic layers or molecular layers of the A gas are adsorbed to the surfaces of the substrates W.

Thereafter, the substrate processing apparatus 200 stops supplying the A gas and supplies the C gas (purge gas) from the third gas injector 251c into the reaction tube 212, at a flow rate of, e.g., 20 slm to 100 slm. Then, the substrate processing apparatus 200 stops the supply of the C gas and supplies the B gas (second process gas) into the reaction tube 212, e.g., at 300 g/Nm³. At this time, the B gas reacts with the components of the A gas adsorbed to the substrates W (for example, the B gas is oxidized), thereby generating a reaction product. Thereafter, the substrate processing apparatus 200 stops supplying the B gas and supplies the C gas to purge the atmosphere of the reaction tube 212.

In the aforementioned manner, the substrate processing apparatus 200 forms reaction product layers on the surfaces of the substrates W by performing, a plurality of times, a cycle of supplying the A gas (reaction gas), the C gas (purge gas), the B gas (reaction gas) and the C gas (purge gas). Consequently, the substrate processing apparatus 200 can form uniform films on the surfaces of the substrates W.

EXAMPLE

The present disclosure will now be described using a pressure measuring instrument 100E according to an example.

[Pressure Measuring Instrument]

Figure 6:
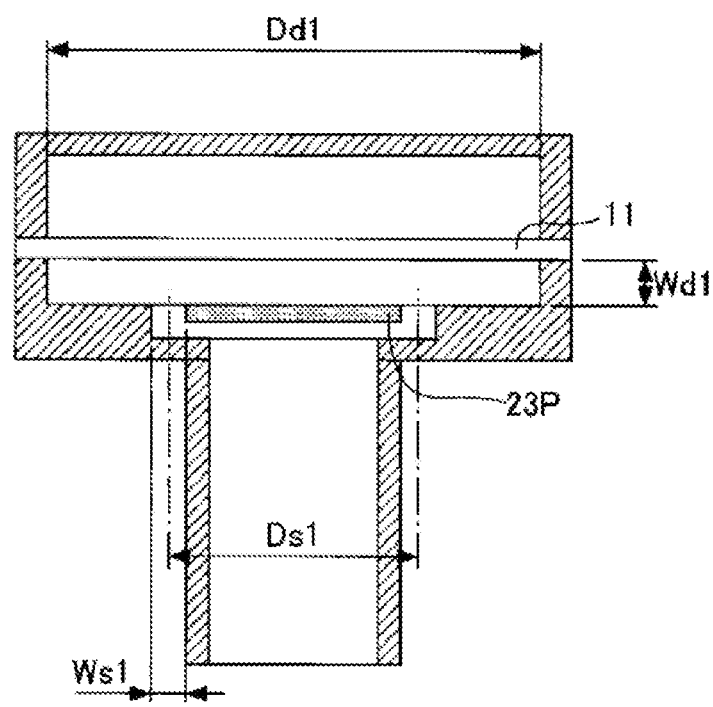
FIG. 6 is a schematic sectional view explaining a pressure measuring instrument according to an example of the present disclosure.

The configuration of the pressure measuring instrument 100E according to the present example will be described in detail with reference to FIG. 6. FIG. 6 is a schematic sectional view explaining the pressure measuring instrument 100E according to the example of the present disclosure.

If the pressure measuring instrument 100E according to the present example is used in the substrate processing apparatus 200 according to the second embodiment and if the reaction products (solids) of the A gas and the B gas are deposited on (or adhere to) the surface of the diaphragm 11, the pressure measuring instrument 100E allows the reaction products to be deposited in the predetermined range Rd at which the amount of change dH is relatively large, thereby reducing the influence of the stresses generated by the reaction products on the deformation of the diaphragm 11.

In the pressure measuring instrument 100E, for example, when it is assumed that the displacement of the diaphragm 11 attributable to the pressure difference is A and the displacement of the diaphragm 11 attributable to the stresses generated by the reaction products is B, the real displacement Ar becomes A+B. A ratio of the real displacement Ar to the displacement A attributable to the pressure difference is given by Ar/A=(A+B)/A=1+B/A. Thus, the pressure measuring instrument 100E according to the present example can increase the displacement A attributable to the pressure difference, thereby making the ratio Ar/A close to 1. That is to say, the pressure measuring instrument 100E according to the present example allows the reaction products to be deposited in (or adhere to) the position of the diaphragm 11 at which displacement A attributable to the pressure difference becomes large. This makes it possible to reduce the influence of the displacement B attributable to the stresses generated by the reaction products on the real displacement Ar.

More specifically, as shown in FIG. 6, a diameter Dd1 of the diaphragm 11 is set equal to 50 mm in the pressure measuring instrument 100E according to the present example. In the pressure measuring instrument 100E, an annular slit is formed by a circular flat plate 23P. In this regard, the medial diameter Ds1 of the annular slit is set equal to 14.4 mm. A width Ws1 of the annular slit is set equal to 3.2 mm. That is to say, in the pressure measuring instrument 100E, the annular slit is formed to have the medial diameter Ds1 equivalent to 28.8% of the diameter Dd1 of the diaphragm 11. Furthermore, in the pressure measuring instrument 100E, the annular slit is formed to have a width Ws1 equivalent to 6.4% of the diameter Dd1 of the diaphragm 11.

Comparative Example 1

Figure 7A:
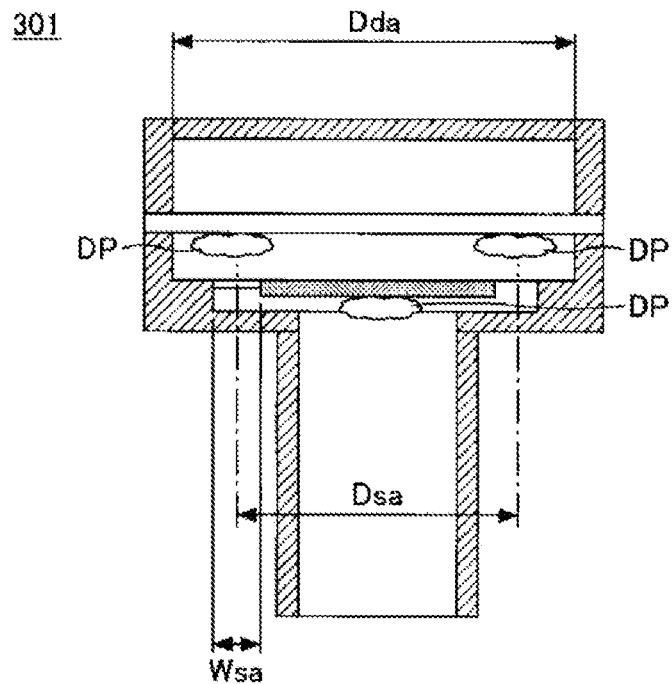
FIGS. 7A and 7B are schematic sectional views explaining comparative examples of the pressure measuring instrument.

FIG. 7A is a schematic sectional view explaining a pressure measuring instrument 301 according to comparative example 1.

As shown in FIG. 7A, in the pressure measuring instrument 301 according to comparative example 1, the diameter Dda of the diaphragm is set equal to 50 mm. In the pressure measuring instrument 301 according to comparative example 1, an annular slit is formed by a circular flat plate. In this regard, the medial diameter Dsa of the annular slit is set equal to 29.5 mm. The width Wsa of the annular slit is set equal to 5.3 mm.

That is to say, the pressure measuring instrument 301 according to the present comparative example differs from the pressure measuring instrument 100E according to the example in terms of the position of the annular slit. More specifically, in the pressure measuring instrument 301 according to the present comparative example, the annular slit is formed to have a medial diameter Dsa equivalent to 59% of the diameter Dda of the diaphragm. Furthermore, in the pressure measuring instrument 301 according to the present comparative example, the annular slit is formed to have a width Wsa equivalent to 10.6% of the diameter Dda of the diaphragm. In this case, in the pressure measuring instrument 301 according to the present comparative example, solids DP adhere to (or are deposited in) the locations indicated in FIG. 7A.

Comparative Example 2

Figure 7B:
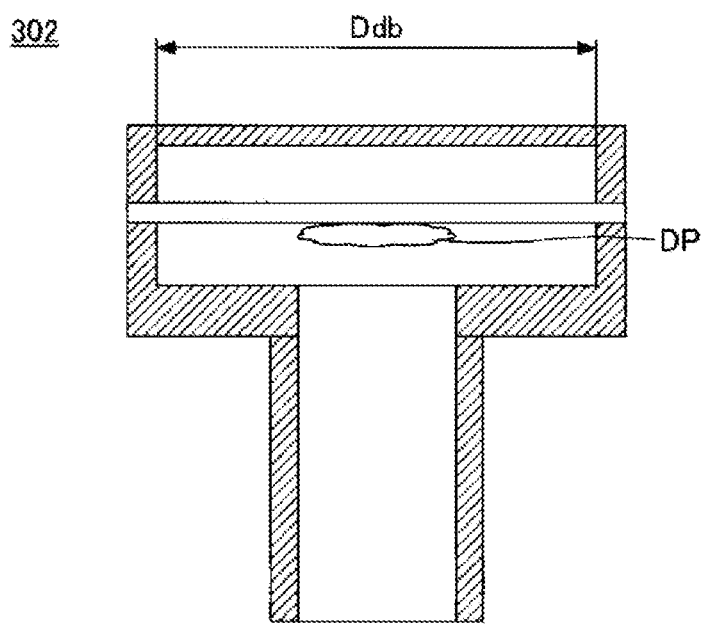

FIG. 7B is a schematic sectional view explaining a pressure measuring instrument 302 according to comparative example 2.

As shown in FIG. 7B, in the pressure measuring instrument 302 according to comparative example 2, the diameter Ddb of the diaphragm is set equal to 50 mm. The pressure measuring instrument 302 according to comparative example 2 does not employ a circular flat plate. That is to say, in the pressure measuring instrument 302 according to the present comparative example, the gas introduced from a pressure measurement space is directly supplied toward the center of the diaphragm. In this case, in the pressure measuring instrument 302 according to the present comparative example, solids DP adhere to (or are deposited on) a location, which is indicated in FIG. 7B.

[Tests]

FIG. 8 shows one example of the results of tests conducted to confirm the effects and advantages of the pressure measuring instrument 100E according to the present example. The tests were conducted to compare the test result L1 for the pressure measuring instrument 100E (see FIG. 6) according to the present example with the test results La and Lb for the pressure measuring instruments 301 and 302 (see FIGS. 7A and 7B) according to the comparative examples. The horizontal axis in FIG. 8 is a use time t of the pressure measuring instruments. The vertical axis in FIG. 8 is a dimensionless number Sp indicating a zero point position of the pressure measuring instrument.

As shown in FIG. 8, the test result L1 for the pressure measuring instrument 100E according to the present example reveals that, even if the use time t increases, the amount of change (hereinafter referred to as a "shift amount") of the zero point position thereof is kept small. On the other hand, the test results La and Lb for the pressure measuring instruments 301 and 302 according to the comparative examples reveal that the shift amount grows larger as the use time t increases. In the pressure measuring instruments 301 and 302 according to the comparative examples, solids are accumulated in the diaphragm as the use time t increases. The shift amount tends to incrementally increase due to the accumulated solids.

In other words, according to the pressure measuring instrument 100E of the present example, it is possible to keep the absolute value of the shift amount small even if the use time t increases (i.e., even if solids adhere to the diaphragm). Furthermore, according to the pressure measuring instrument 100E of the present example, based on a shift direction that the shift amount is changed from the zero point position, it is possible to change the shift amount in a minus shift direction. Accordingly, the pressure measuring instrument to which the present disclosure is applicable can control the shift amount and/or the shift directions by setting the outer diameter (diameter) of the circular flat plate (e.g., reference symbol 23P in FIG. 6) corresponding to the diameter of the diaphragm (e.g., Dd1 in FIG. 6). In the pressure measuring instrument 100E according to the present example, if one wishes to shift the shift amount, e.g., in the minus shift direction to enhance the safety of the apparatus, the outer diameter of the circular flat plate can be decided such that solids adhere to a location more closer to the outer edge than the predetermined range (Rd in FIG. 3). In the pressure measuring instrument 100E according to the present example, if one wishes to shift the shift amount, e.g., in the plus shift direction to enhance the safety of the apparatus, the outer diameter of the circular flat plate can be decided such that solids adhere to a location more closer to the center than the predetermined range (Rd in FIG. 3).

As described above, in the pressure measuring instrument 100E according to the present example, as compared with the pressure measuring instruments 301 and 302 of the comparative examples, it is possible to reduce the influence of the stresses generated by the solids adhering to (or educing in) the diaphragm on the shift amount. Furthermore, according to the pressure measuring instrument 100E of the present example, the shift amount is kept small even if the solids adhere to the diaphragm. It is therefore possible to accurately measure a pressure based on the deformation of the diaphragm. Moreover, according to the pressure measuring instrument 100E of the present example, when measuring the internal pressure of a process chamber of an apparatus for processing substrates using an atomic layer deposition method, even if two kinds of gases reacting with each other alternately make contact with the surface of the diaphragm and even if reaction products of two kinds of gases are deposited on the surface of the diaphragm, it is possible to reduce the influence of the stresses generated by the educing reaction products on the shift amount.

While the present disclosure has been described above with reference to the embodiments and the examples on the pressure measuring instrument of the present disclosure or the substrate processing apparatus provided with the pressure measuring instrument, the present disclosure is not limited to the embodiments and the examples described above but may be differently changed or modified in light of the appended claims.

According to the present pressure measuring instrument or the present substrate processing apparatus, even if solids adhere to the diaphragm, it is possible to reduce the influence of the stresses generated by the adhered solids on the deformation of the diaphragm.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A pressure measuring instrument that, using a diaphragm disposed between a reference pressure chamber and a measurement pressure chamber, detects a deformation of the diaphragm and consequently measures a pressure of the measurement pressure chamber, the pressure measuring instrument comprising:
a detecting unit including the reference pressure chamber therein and formed in a cylindrical shape, the diaphragm being disposed inside the detecting unit;
a communicating unit for providing communication between the diaphragm and the measurement pressure chamber, and formed in a circular tube shape having an inner diameter smaller than an inner diameter of the detecting unit; and
an annular flow-path forming unit disposed between the detecting unit and the communicating unit, and configured to form a substantially annular path,
wherein the communicating unit configured to introduce a gas of the measurement pressure chamber into the substantially annular path, the annular flow-path forming unit configured to allow the gas introduced from the communicating unit to pass through the substantially annular path and to supply the passing gas to a side surface of the diaphragm, and the substantially annular path is formed at a location opposite to a location at which a differential value dH of a displacement H per unit area of the diaphragm reaches a peak, while the substantially annular path being not formed at a location opposite to a location at which a differential value dH of a displacement H per unit area of the diaphragm is 0.

2. The instrument of claim 1, wherein a range of inner and outer diameters of the substantially annular path is a predetermined range opposite to a location at which the diaphragm is axial-symmetrically deformed by a difference in pressure between the reference pressure chamber and the measurement pressure chamber.

3. The instrument of claim 1, wherein the annular flow-path forming unit includes a circular flat plate having an outer diameter within a range of 10% to 30% of an inner diameter of the detecting unit or an outer diameter of the diaphragm.

4. The instrument of claim 3, wherein the outer diameter of the circular flat plate is set based on the inner diameter of the detecting unit or the outer diameter of the diaphragm so as to control at least one of a shift amount and a shift direction of the diaphragm.

5. The instrument of claim 1, wherein the deformation of the diaphragm is detected in a capacitative, piezoelectric or optical manner.

6. A substrate processing apparatus, comprising:
the pressure measuring instrument of claim 1; and a substrate processing unit configured to process a substrate in a process chamber that communicates with the measurement pressure chamber.

\* \* \* \* \*